United States Patent [19]
Chang

[11] Patent Number: 5,117,676
[45] Date of Patent: Jun. 2, 1992

[54] LEAK DETECTOR FOR NATURAL GAS PIPELINES

[75] Inventor: David B. Chang, Tustin, Calif.

[73] Assignee: Hughes Aircraft Company, Los Angeles, Calif.

[21] Appl. No.: 659,670

[22] Filed: Feb. 25, 1991

[51] Int. Cl.$^5$ .............................................. G01M 3/24
[52] U.S. Cl. ...................................... 73/40.5 A; 73/592
[58] Field of Search ............................. 73/40.5 A, 592

[56] References Cited

U.S. PATENT DOCUMENTS

| | | | |
|---|---|---|---|
| 4,201,092 | 5/1980 | Dau | 73/40.5 A X |
| 4,457,163 | 7/1984 | Jäckle | 73/40.5 A |

FOREIGN PATENT DOCUMENTS

| | | | |
|---|---|---|---|
| 34334 | 2/1983 | Japan | 73/40.5 A |
| 55540 | 3/1987 | Japan | 73/40.5 A |
| 1179119 | 9/1985 | U.S.S.R. | 73/592 |

Primary Examiner—Hezron E. Williams
Assistant Examiner—Joseph W. Roskos
Attorney, Agent, or Firm—Michael W. Sales; Wanda K. Denson-Low

[57] ABSTRACT

A simple acoustic detection system is described for measuring leaks from long gas pipelines. Microphones are strung along (and attached to) the pipeline exterior. The outputs of the microphones are spectrally analyzed. A peak at a frequency $f \approx V_s/(2d)$ and its harmonics indicates a leak in the vicinity of the recording microphone, where $V_s$ is the velocity of sound in the gas and $d$ is the thickness of the pipe wall.

12 Claims, 1 Drawing Sheet

LEAK DETECTOR FOR NATURAL GAS PIPELINES

BACKGROUND OF THE INVENTION

The invention relates to a method and system for detecting leaks from long gas pipelines.

Gas pipeline leak detection can be sensed by smell (if an odorous additive is present) or by other means of direct detection of gas, such as a mass spectrometer. Detection by smell requires the presence of a person. Mass spectrometry, while very effective, is relatively expensive.

It is therefore an object of the present invention to provide an inexpensive, permanently installed system capable of detecting even the minutest of leaks in gas pipelines.

A further object is to provide a method for detecting leaks from holes in pressurized gas pipelines and indicating the vicinity of such leaks.

Another object of the invention is the protection of the environment by minimizing the waste of energy resources.

SUMMARY OF THE INVENTION

A leak detection system is described for detecting leaks of pressurized gas from one or more holes in a long pipeline having a pipeline wall thickness d. The system includes a plurality of acoustic microphones arranged along the extent of the exterior surface of the pipeline. The microphones are responsive to sounds generated by gases escaping through one or more holes in the pipeline and generating microphone signals indicative of the intensity and spectral content of the sounds. The system further includes an acoustic spectrum analyzer responsive to the microphone signals for detecting peaks in the spectral content of the signals which are at wavelengths which are submultiples of 2d. This indicates that the escaping gas has set up standing waves in a pipeline hole. The vicinity of the hole location can be determined by locating the microphone which generates the signals having peaks at this wavelength or harmonics thereof.

A method of detecting leaks from a pressurized gas pipeline is also disclosed, and comprise the steps of arranging in a spaced arrangement a plurality of acoustic microphones along the extent of the pipeline to be monitored for leaks, analyzing the microphone outputs to determine when peaks in the acoustic spectral response occur at predetermined wavelengths, and declaring that a leak has been detected when such peak or peaks have been detected.

BRIEF DESCRIPTION OF THE DRAWING

These and other features and advantages of the present invention will become more apparent from the following detailed description of an exemplary embodiment thereof, as illustrated in the accompanying drawing, in which.

DETAILED DESCRIPTION OF THE PREFERRED EMBODIMENT

Figure 1:
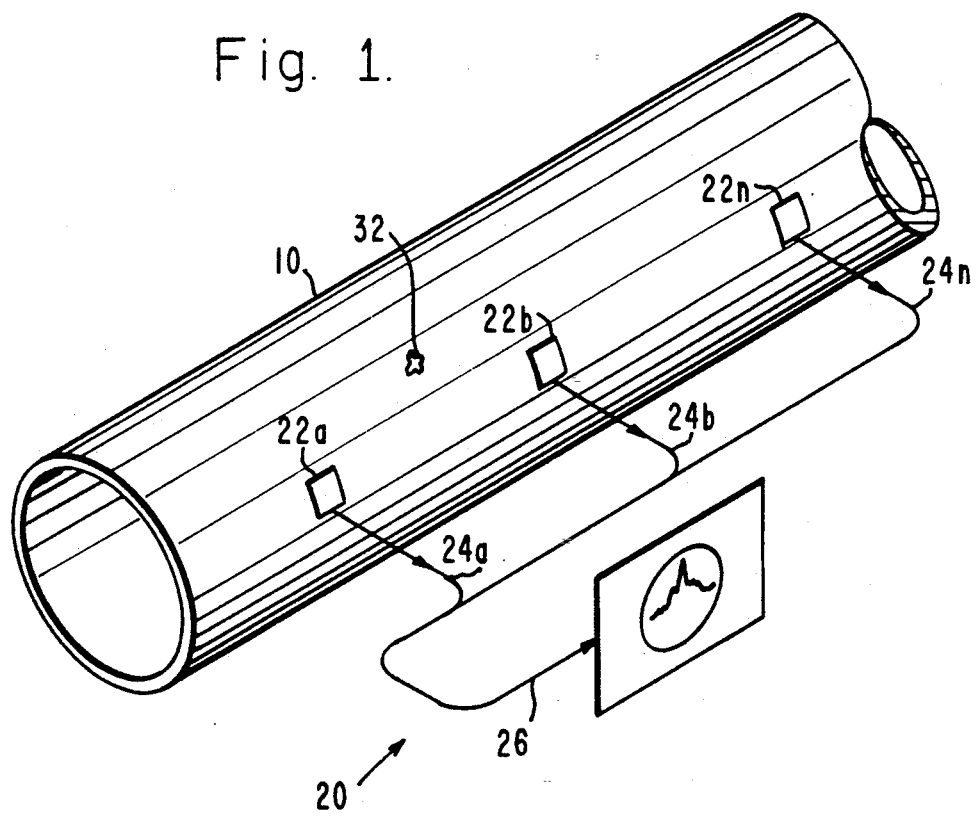
FIG. 1 is a simplified schematic block diagram illustrative of an embodiment of the invention.

FIG. 1 illustrates an exemplary system 20 in accordance with the invention for measuring leaks from long gas pipelines. A plurality of microphones 22A-N are strung along (and attached to) the exterior surface of the pipeline 10. The microphones 22A-N can be piezoelectric or fiber optic detectors, for example. A fiber optic interferometric microphone is particularly sensitive since it detects sound by detecting changes in the fringe pattern resulting from changes in the optical path length of the arms of a Mach-Zehnder interferometer comprised of optical fibers. The outputs of the microphones are connected via conductor lines 24A-N and bus 26 to an acoustic spectrum analyzer 28, where the outputs are spectrally analyzed.

The microphones 22A-N are preferably connected to the analyzer in such a way as to permit the analyzer to isolate analysis on a particular microphone to determine the vicinity of the gas leak and thereby facilitate repairs. A multiplexer apparatus, for example, can be used to select one of the microphone inputs to be analyzed.

Because the gas in the pipeline 10 is under high pressure, a small hole 32 in the pipeline 10 will emit sound as gas is forced through the hole. A resonance will occur in the excited sound at frequencies in which standing waves are established in the hole. This will occur at wavelengths which are in submultiples of 2d, where d is the thickness of the wall. Thus, the frequency F of sounds excited by pressurized gas escaping through a hole in the pipeline follows the relationship of eq. 1, $$F = (nV_s/2d) \tag{1}$$

where $V_s$ is the speed of sound in the gas and n is the harmonic number. This leak detection is based, then, on the increased sound generated in the vicinity of the leak, and in particular on the characteristic acoustic spectrum associated with the leak.

A peak at a frequency $f \approx V_s/(2d)$ and the harmonics indicates a leak in the vicinity of the particular recording microphone. The spectrum analyzer could include means for monitoring the spectrum analysis, and generating a leak detection signal when a peak is detected at the frequency of eq. 1. As will be apparent to those skilled in the art, such a means could be automated, and include a computer monitoring the spectrum and generating a leak detection alarm when a peak at the appropriate frequency is detected.

The steps of detecting a gas leak from a hole in gas pipeline in accordance with the invention can include the following steps:

(i) receiving output signals from at least one microphone, or a plurality of spaced microphones, arranged along the extent of the exterior surface of the pipeline to be monitored for leaks;

(ii) analyzing the microphone output signal or signals to determine when peaks in the acoustic spectral response occur at predetermined wavelengths; and (iii) declaring that a leak has been detected when such peak or peaks have been detected.

The method can further include the step of indicating the vicinity of the leak by determining which microphone is producing the output with such a peak.

It is understood that the above-described embodiment is merely illustrative of the possible specific embodiments which may represent principles of the present invention. Other arrangements may readily be devised in accordance with these principles by those skilled in the art without departing from the scope and spirit of the invention. For example, when the extent of the pipeline to be monitored for leaks is short, a single microphone could be used instead of an extended array.

The microphones could be placed on the interior surface of the pipeline instead of the exterior surface, since the spectrum of the sound of the gas moving through the pipeline in the leak-free case will not include a resonance at a characteristic frequency, such as that established by eq. 1.

What is claimed is:

1. A gas leak detection system for detection of leaks of pressurized gases from long pipelines, comprising:
   a plurality of acoustic transducers disposed along the pipeline and responsive to acoustic energy for respectively generating transducer signals indicative of incident acoustic energy; and
   an acoustic spectrum analyzer coupled to and responsive to said transducer signals for generating a leak detection signal indicating that a leak has been detected when one or more of said signals indicates that a standing wave has been established as a result of a leak in the pipeline.

2. The system of claim 1 wherein said leak detection signal is generated when resonances are detected at wavelengths which are submultiples of $2d$, where d represents the thickness of the pipeline wall.

3. The system of claim 1 wherein said acoustic spectrum analyzer comprises means for detecting peaks in the acoustic response of said transducers at a frequency of $f = Vs/(2d)$, where Vs represents the speed of sound in the gas and d represents the thickness of the pipeline wall, and means for generating said leak detection signal when a peak at said frequency is detected.

4. The system of claim 1 further characterized in that a plurality of transducers are arranged in a spaced relationship along the extent of the pipeline to be monitored for leaks, and further comprising means for determining which of said transducer output signals indicates that a standing wave has been established in a hole, and means for indicating which transducer or transducer is generating said indication to locate the vicinity of said hole.

5. The system of claim 1 wherein said one or more transducers is located along the exterior surface of said pipeline.

6. The system of claim 1 wherein said one or more transducers comprises a microphone.

7. A leak detection system for detecting leaks of pressurized gas from one or more holes in a long pipeline having a pipeline wall thickness d, comprising:
   a plurality of spaced acoustic microphones arranged along the extent of the exterior surface of said pipeline to be monitored for gas leaks, said microphones responsive to sounds generated by gases escaping through one or more holes in said pipeline and generating microphone signals indicative of the intensity and spectral content of said sounds; and
   an acoustic spectrum analyzer responsive to said microphone signals for detecting peaks in the spectral content of said signals which are at wavelengths which are submultiples of $2d$.

8. The leak detection system of claim 7 wherein said analyzer further comprises means for determining which of said microphones is generating a signal having a peak at said wavelength, and providing a signal indicating said microphone or microphones generating said signal to indicate the vicinity of said hole.

9. A method for detecting leaks of pressurized gas from one or more holes in a long pipeline having a pipeline wall thickness d, comprising a sequence of the following steps:
   providing the outputs from one or more acoustic microphones arranged along the pipeline, said one or more microphones responsive to sounds generated by gas escaping through one or more holes in said pipeline to generate microphone output signals indicative of the intensity and spectral content of said sounds;
   analyzing the microphone outputs to determine when peaks in the acoustic spectral response occur at predetermined wavelength which are submultiples of $2d$;
   declaring that a leak is occurring when such peak or peaks are determined.

10. The method of claim 9 wherein said one or more microphones is arranged on the outer surface of the wall of the pipeline.

11. The method of claim 9 further characterized in that the output signals from a plurality of spaced acoustic microphones are provided, and further comprising the step of indicating the vicinity of the hole in the pipeline, by determining the particular microphone or microphone which is generating the signal characterized by said peak or peaks.

12. A leak detecting system for detecting leaks of pressurized gas from one or more holes in a long pipeline having a pipeline wall thickness d, comprising:
   a plurality of spaced fiber optic interferometric microphones arranged along the extent of the exterior surface of said pipeline and responsive to sounds generated when gas escapes through one or more holes in said pipeline for generating signals indicative of standing waves in said pipeline; and
   an acoustic spectrum analyzer responsive to said microphone signals for detecting peaks in the spectral content of said signals.

* * * * *